2 Sheets—Sheet 1.
A. A. DURAND.
Cow-Milking Apparatus.
No. 223,491. Patented Jan. 13, 1880.
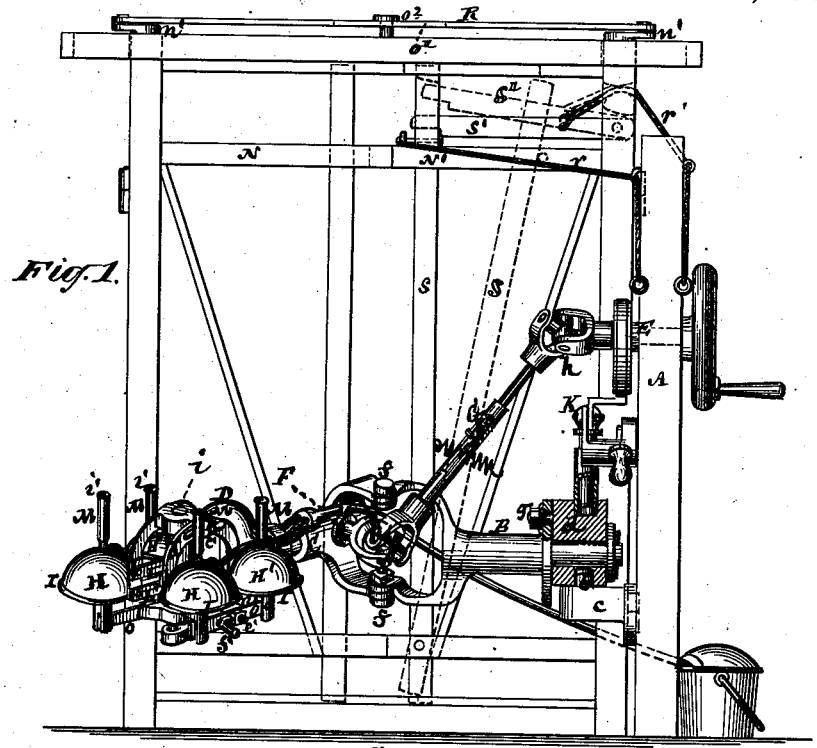
Fig. 1.
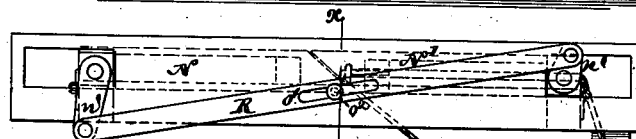
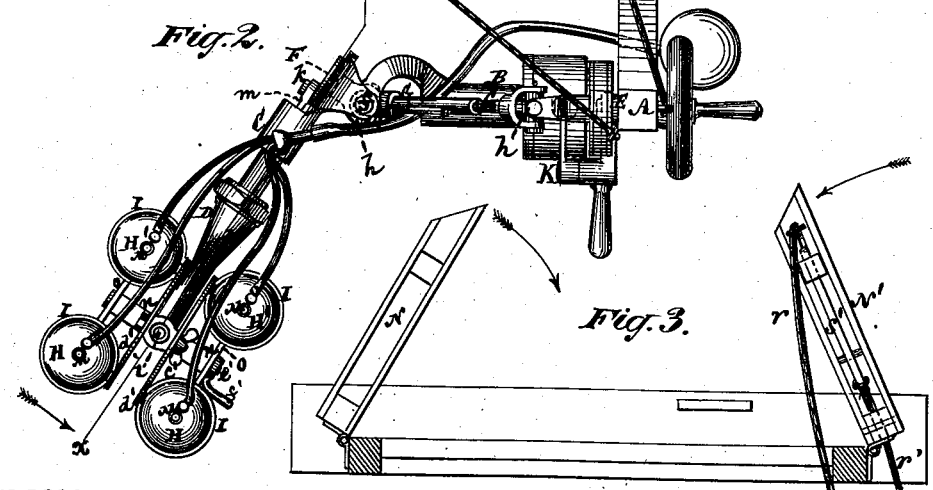
Fig. 2.
Fig. 3.
Witnesses
John Becker
Fred F. Haynes
Inventor
Albert A. Durand
by his Attorneys
Brown & Brown A. A. DURAND.
Cow-Milking Apparatus.
No. 223,491. Patented Jan. 13, 1880.
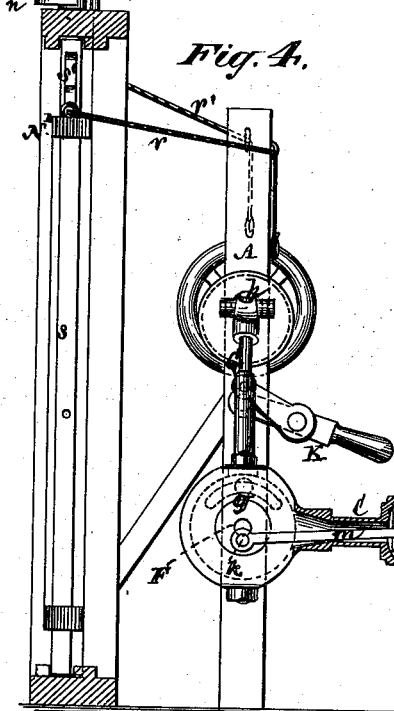
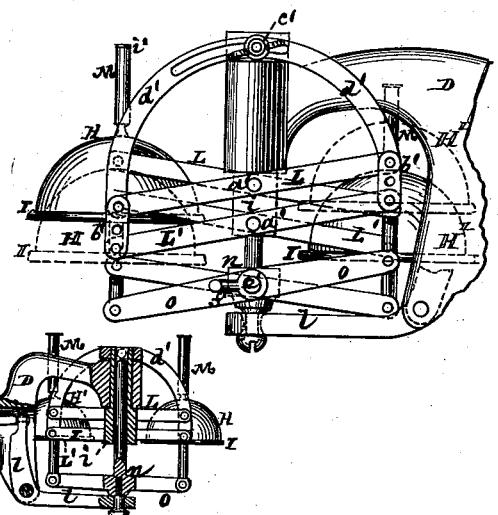
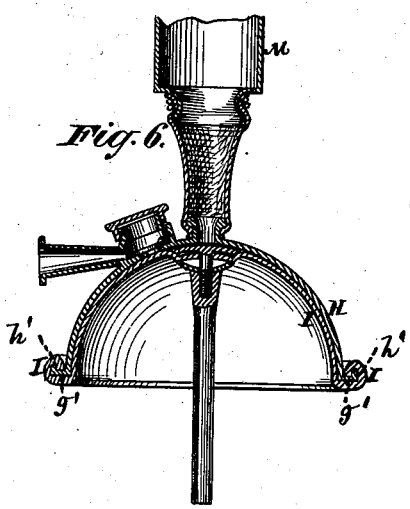
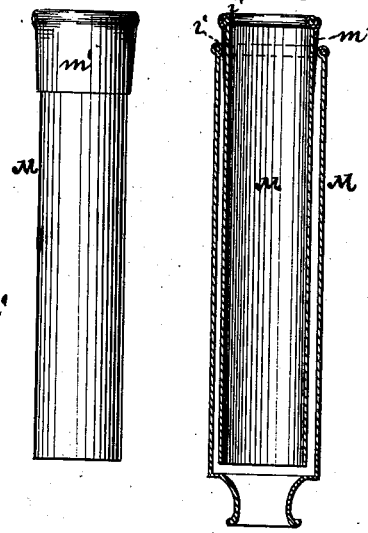
Witnesses
John Becker
Fred K. Haynes
Inventor
Albert A. Durand
by his Attorneys
Brown & Brown

UNITED STATES PATENT OFFICE.

ALBERT A. DURAND, OF NEW YORK, N. Y.

COW-MILKING APPARATUS.

SPECIFICATION forming part of Letters Patent No. 223,491, dated January 13, 1880.

Application filed April 26, 1879.

*To all whom it may concern:*

Be it known that I, ALBERT A. DURAND, of the city and State of New York, have invented certain new and useful Improvements in Cow-Milking Apparatus, of which the following is a description, reference being had to the accompanying drawings, forming part of this specification.

This invention more particularly relates to cow-milkers in which a series of diaphragm-pumps are operated directly by mechanical means for extracting the milk simultaneously from the several teats of a cow; but it is also applicable in part to what are known as "hydraulic cow-milkers" and to other milkers. Furthermore, although the invention is here shown adapted to a hand-power machine for milking one cow at a time, it is applicable to milking apparatus driven by steam or other power, or to any number of such apparatus deriving their motion from a single prime mover.

The invention consists in certain combinations of devices, with a universally-adjustable arm-like support for the pumps of a milking apparatus, including an extensible intermediate shaft, whereby increased facilities are afforded for operating the pumps, and for adjusting the frame or holder which carries them to suit different positions or sizes of animals being milked.

The invention likewise consists in certain combinations of means for providing for the separate adjustment of the several pumps in a series in proper relation with the teats to be milked.

The invention likewise consists in a teat-cup of rigid material and of cylindrical or approximately cylindrical form throughout its length, and with an internally-projecting rounded edge at its upper or mouth end, also, preferably, of telescopic construction, and made in sections, forming a nest of cups, whereby a more efficient action generally is obtained for the teat-cup, and its adaptability to different-sized teats is enlarged.

Furthermore, the invention consists in a combination, in a cow-milking apparatus, with swinging gates or stanchions for securing the cow when being milked and for admitting of her passage between them when liberated, of a slotted bar connecting the gates, whereby both gates or stanchions are opened or closed simultaneously and securely locked when shut.

Inasmuch as certain features of the invention have either a direct or indirect bearing on the inventions of L. O. Colvin, as secured to him by sundry Letters Patent, including the Letters Patent No. 74,507, granted him February 18, 1868, and have also principles in common with those shown in the invention for which Letters Patent No. 198,362 were granted me December 18, 1877, only cursory reference will be made in the following description to such parts as are common in explaining this invention.

Figure 1 represents a partly-sectional elevation of a cow-milking apparatus having my invention applied; Fig. 2, a plan view of the same; Fig. 3, a horizontal section in part, showing the gates or stanchions of the apparatus, with means for opening and closing them; Fig. 4, a vertical section mainly on the line $x$ $x$ in Fig. 2; Fig. 5, an elevation, upon a larger scale, of a certain parallel-motion mechanism for adjustment of the pumps; Fig. 6, a vertical section of one of the pumps with a teat-cup in part attached; and Figs. 7 and 8, a vertical section and exterior longitudinal view of a teat-cup formed in nests and of telescopic construction, as hereinafter described.

A is the post by which the apparatus is carried, and B C the arm-like swinging supports which carry the pump frame or holder D. The support B, which is capable of horizontal adjustment about a pivot, $b$, on a swiveling bracket, $c$, connected with the post A, and of an oscillating motion or adjustment about its longitudinal axis within a box, $d$, which turns on the pivot $b$, is connected, by an open elbow-joint, $f$, with the other arm-like swinging support, C, the outer end of which carries the pump frame or holder D, that is free to turn axially within or on the support C.

The arm-like support B may be connected with the box $d$ by a screw, $g$, passing through a slot in the bead of said arm, to provide for the adjustment of said arm about its longitudinal axis.

E is a primary revolving shaft having its bearings in the post A, and which may either be rotated by hand or by steam or other power from a shaft, which may be used to drive a series of milking apparatus, and F is a secondary shaft having its bearings in the arm or support C. Connecting these shafts E and F, by means of universal joints h h, is a sectionally-constructed and longitudinally-extensible oblique intermediate shaft, G, which not only provides for communicating motion from the shaft E to the shaft F, but, by its capability to expand and contract, allows of a very extended adjustment of the pump frame or holder D by its universally-adjustable arm-like supports B C to suit different positions of the cow being milked, or as different-sized animals may require, as in the hydraulic cow-milker described in Letters Patent No. 198,362, granted me December 18, 1877, and the pump frame or holder D is not only made axially adjustable, but the series of pumps H H are also made collectively adjustable in a circular direction by a stem, $i$, arranged at right angles to the axis of said holder, as and for the purposes described in said patent.

The diaphragm-pumps H H', of which there are here shown four in a series, but of which there may be any desired number, are operated by a crank, $k$, on the rotating shaft F through the instrumentality of a bell-crank, $l$, connected with the crank $k$ by a rod, $m$, and attached to a cross-bar, $n$, which, by means of side arms, $o$, actuate the rods to which the flexible diaphragms I of the pumps are attached.

To obtain for the milker a "bunting" movement, and to elevate or lower the diaphragm-pumps for the purpose of adapting the machine to large or small, short-legged or long-legged cows, cows with very dependent udders, or contrariwise, the arm-like support B has connected with it an adjustable oscillating device, K, substantially similar to that described in my hereinbefore-named Letters Patent No. 198,362.

The several pumps H H' are also made adjustable up or down independently of their frame or holder D to raise or lower the teat-cups M, which they carry for the purpose of adapting said cups to different lengths of teats or different altitudes of the latter from the ground. This it is preferred to do by suspending each pair of pumps H H' by an adjustable parallel bar frame or support to the circularly-adjustable stem $i$, (see more particularly Fig. 5,) such frame or support consisting of parallel bars L L', pivoted at $a'$ $a'$ to the stem $i$, and connected at their respective ends by links $b'$ $b'$. By this means each pair of pumps H H' may be independently adjusted, one pump of each pair of pumps H H' moving up while the other is moving down, thus dividing the movement of said pumps to effect their up or down adjustment, and preserving the perpendicularity of the pumps throughout their up or down adjustments. A set-screw, $c'$, and slotted curved brace $d'$, connecting opposite ends of each bar L L', provides for securing the pumps when adjusted up or down by its parallel bar frame or support. The side arms, $o$, are also pivoted at $e'$ to the cross-bar $n$, to conform to the adjustment of the pumps up or down, and are secured, when adjusted, by a clamp, $f'$.

The pump-chamber or pumps H H' are each constructed with a flange, $g'$, at their base, and said flange formed with a bead or raised edge, $h'$. (See more particularly Fig. 6.) This construction provides for either pump-diaphragm I being secured in a close or air-tight manner to its place without the aid of a separate or detachable flange by causing the edges of said diaphragm to lap over and hug the bead $h'$ on the flange of the pump-chamber. Such construction also provides for the ready attachment and detachment of the diaphragms of the pumps when necessary.

The teat-cups M are of rigid material, and of cylindrical or approximately cylindrical form throughout their length, and with an internally-projecting rounded edge, $i'$, at their upper end, whereby the teat-cups are prevented from pressing laterally on the teats, thus leaving the teats free to be controlled by the suction of the pumps, yet securing a close joint, free from any cutting or damaging action of said cups at their rounded upper edges. Furthermore, said cylindrical teat-cups are of a telescopic construction, each one being composed of two or more cups of cylindrical form, and arranged one within the other, and each inner cup (see more particularly Fig. 7) preferably made so that it may be drawn out or removed from the cup which is on the outside of it, and fitted with a flexible packing, $m'$, to provide for the close fit of the cups. Thus each teat-cup is composed of a nest of cups, which not only provide for the telescopic adjustment of the teat-cup to the teat, but by inserting or removing an inner cup also provide for the fit of the teat-cup to a large or small teat.

N N' are the gates or stanchions used to secure the cow while being milked, and, when open, admitting of her passage between them, as in other cow-milking apparatus; but in the present instance both gates are made to open and close simultaneously instead of separately, and one gate made to close a little in advance of the other by means of a bar, R, arranged to connect differently-arranged or set cranks $n'$ $n'$ at the hinge ends of the gates. This bar has a slot, $o'$, in it to receive through it a holding-down guide-pin, $o^2$, which directs the bar in moving and prevents it from springing to interfere with the action of the gates. By thus connecting the gates or stanchions and constructing them with miter faces where they meet when closed, not only are both gates simultaneously opened or closed, but a single locking spring-bar, $s$, and single catch-bar $s'$, controlled by cords $r$ $r'$, applied to only one of the gates, answer the same purpose as like devices applied to each of the gates, as heretofore done, and the gates are just as securely locked.

I claim—

1. The combination, with a universally-adjustable arm-like support or supports for the pumps, and a primary shaft and secondary shaft for actuating said pumps, of a longitudinally-extensible shaft between said primary shaft and secondary shaft, and universal joints connecting the ends of said extensible shaft with said primary shaft and secondary shaft, substantially as specified.

2. The combination, with the arm-like swinging supports B C and their connecting-joint *f*, of the shafts E F, for giving motion to the pumps, the extensible shaft G, and the universal joints *h h*, by which said extensible shaft is connected with the shafts E F, substantially as specified.

3. The combination, in a cow-milking apparatus, with the pump frame or holder, of one or more pumps adjustable up or down in relation with said holder, essentially as and for the purposes described.

4. The combination, with one or more pairs of milking-pumps, of one or more adjustable parallel bar frames or supports for said pumps, arranged to provide for the reverse parallel adjustment up and down of each or either pair of pumps and their attached teat-cups, essentially as and for the purposes herein set forth.

5. The combination of the pump frame or holder D, the pumps H H', the circularly-adjustable stem *i*, the parallel bars L L', and the links *b' b'*, essentially as shown and described.

6. A teat-cup of rigid material, and constructed of cylindrical or approximately-cylindrical form throughout its length, and with an internally-projecting rounded edge at its upper or mouth end, essentially as described.

7. The combination, with a milking-pump, of a telescopic teat-cup, composed of a series of cups of cylindrical construction, and arranged to fit one within the other, substantially as specified.

8. The combination, with an outer teat-cup of cylindrical construction, of one or more inner teat-cups, adapted to form, in connection with the outer cup, a nest of cups, and fitted with a flexible packing to provide for the close fit of the cups, essentially as described.

9. The combination, in a cow-milking apparatus, with the swinging gates or stanchions N N', of the slotted bar R, connecting said gates, substantially as and for the purposes specified.

ALBERT A. DURAND.

Witnesses:
E. P. JESSUP,
T. J. KEANE.